(12) United States Patent
Clough

(10) Patent No.: US 7,084,997 B2
(45) Date of Patent: Aug. 1, 2006

(54) SCHEDULE-BASED PRINTER SELECTION

(75) Inventor: James Clough, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 916 days.

(21) Appl. No.: 09/905,414

(22) Filed: Jul. 13, 2001

(65) Prior Publication Data

US 2003/0011811 A1    Jan. 16, 2003

(51) Int. Cl.
     *G06F 15/00*    (2006.01)
(52) U.S. Cl. .................. 358/1.15; 358/1.13; 358/1.14; 709/207; 399/87
(58) Field of Classification Search ............... 358/1.14, 358/1.13, 1.15; 399/87; 713/200; 715/744; 709/207; 340/7.41; 368/10; 379/90.01
See application file for complete search history.

(56) References Cited

U.S. PATENT DOCUMENTS

| | | | | |
|---|---|---|---|---|
| 4,548,510 | A | * | 10/1985 | Levine ......................... 368/10 |
| 4,872,005 | A | * | 10/1989 | DeLuca et al. ............. 340/7.41 |
| 5,287,194 | A | | 2/1994 | Lobiondo |
| 5,754,744 | A | * | 5/1998 | Matsumoto et al. ........ 358/1.13 |
| 5,905,777 | A | * | 5/1999 | Foladare et al. .......... 379/90.01 |
| 5,933,686 | A | * | 8/1999 | Ootsuka et al. ................ 399/87 |
| 5,978,837 | A | * | 11/1999 | Foladare et al. ............. 709/207 |
| 6,587,126 | B1 | * | 7/2003 | Wakai et al. ................ 715/744 |
| 6,667,810 | B1 | * | 12/2003 | Jeyachandran et al. ..... 358/1.14 |
| 6,707,570 | B1 | * | 3/2004 | Gotanda et al. ............ 358/1.15 |
| 6,791,703 | B1 | * | 9/2004 | Maeda et al. ............... 358/1.15 |
| 6,822,754 | B1 | * | 11/2004 | Shiohara ..................... 358/1.15 |
| 2002/0016921 | A1 | * | 2/2002 | Olsen et al. ................. 713/200 |

FOREIGN PATENT DOCUMENTS

| | | |
|---|---|---|
| EP | 0656581 | 6/1995 |
| EP | 0851384 | 7/1998 |
| EP | 0893753 | 1/1999 |
| JP | 07152510 | 6/1995 |

OTHER PUBLICATIONS

"Methodology for Automated Printed Selection"; IBM Technical Disclosure Bulletin; vol. 36 No. 09B; Sep. 1993, p. 379.
"OS/2 Office: Specifying Time/Date to Print Documents at Creation of Print Job"; IBM Technical Disclosure Bulletin; vol. 34 No. 08; Jan. 1992, pp. 399-400.
Search Report for French Patent Application No. 0208745, filed on Jul. 11, 2002.

* cited by examiner

*Primary Examiner*—Kimberly Williams
*Assistant Examiner*—Satwant Singh

(57) ABSTRACT

A method and a system for selecting a printing site for a print job based on a schedule. The schedule includes a printing period linked to an appointment location. A start time for printing is compared with the printing period. If the start time is within the printing period, a printer is selected that corresponds to the appointment location.

17 Claims, 3 Drawing Sheets

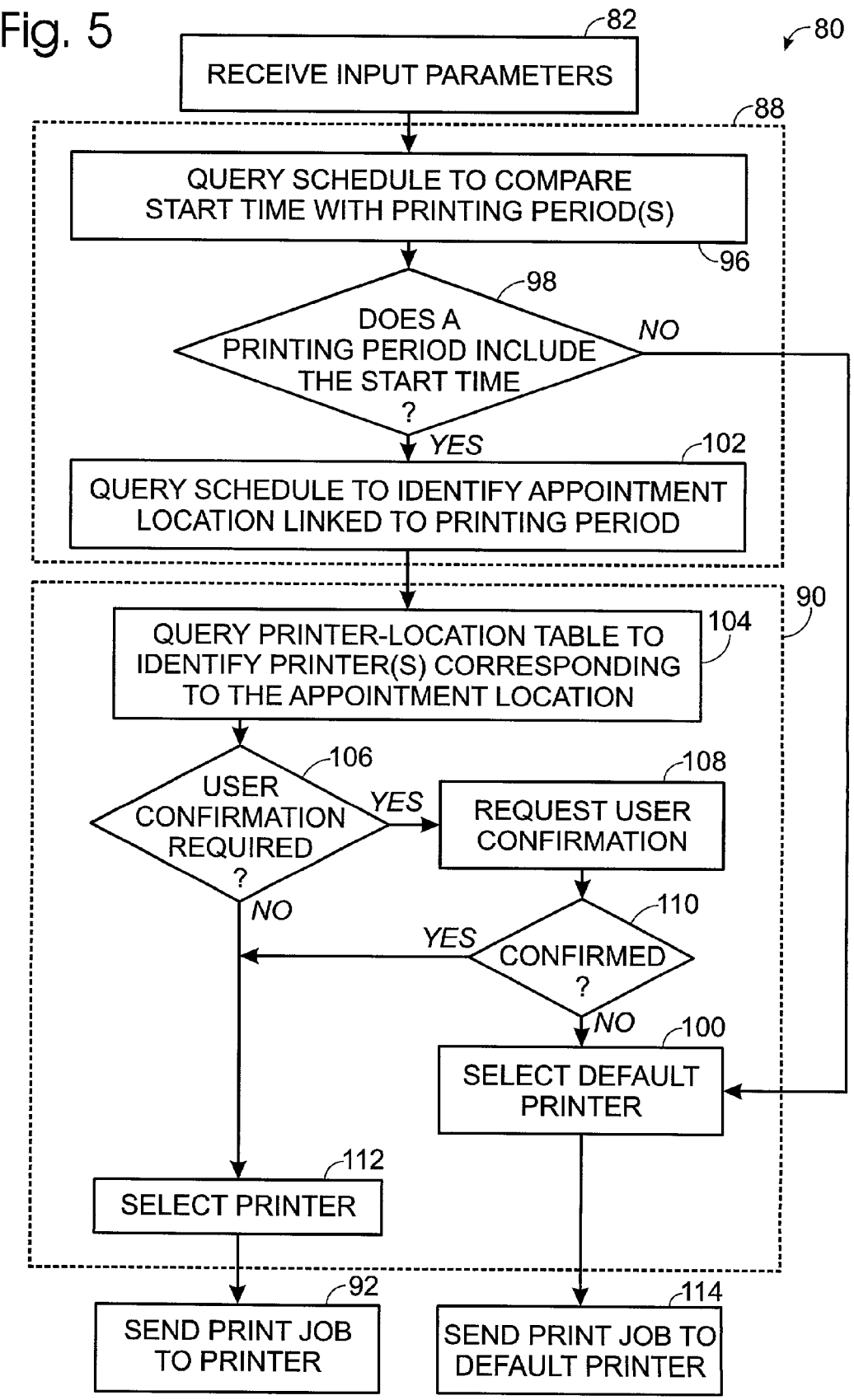

SCHEDULE-BASED PRINTER SELECTION

FIELD OF THE INVENTION

The present invention relates to printing. More specifically, the present invention relates to the selection of a printer at a printing site based on a schedule of a user.

BACKGROUND OF THE INVENTION

Users of computer networks are becoming increasingly mobile. At a growing rate, users access both local and wide area networks from portable processors, such as laptop computers, personal digital assistants, and cellular phones with networking capabilities. Mobile users would benefit from printing that is offered as a network service at remote sites. However, for most users printing is carried out at a default location, independent of where the mobile user is currently located. For example, most network users have a default printer to which print jobs are automatically sent.

Print menus have been modified to improve this situation. In many local area networks, for example within a company or institution, the user may be offered a choice of printers that are available through the local area network. The choice of printers allows the user to select a remote printer that is distinct from the default printer to accommodate mobility of the user within the local area network. For example, if the user has an alternate work site within the company, the user may frequently print to a non-default printer at the alternate work site. However, in many cases an appropriate non-default printer is difficult for the user to identify. The name of potential printers may not be correlated well with the location of the potential printers, thus proximity of each potential printer to the alternate work site may be difficult for the user to ascertain.

The difficulty of identifying a convenient printer for a user is compounded when the user has a complex schedule that includes meetings at many different locations both within the company and outside of the local area network of the company. In this case, the user may find it virtually impossible to correctly select printers that correspond to each location in the schedule. Thus, the user may be unaware of more convenient printers offered by the print menu and may come to rely solely on the default printer, even when another printer would be more suitable. A method is required to automate selection of an appropriate printer based on the user's schedule.

SUMMARY OF THE INVENTION

The present invention provides a method and a system for selecting a printing site for a print job based on a schedule. The schedule includes a printing period linked to an appointment location. A start time for printing is compared with the printing period. If the start time is within the printing period, a printer is selected that corresponds to the appointment location.

BRIEF DESCRIPTION OF THE FIGURES

FIG. 5 is an expanded flowchart for the method of FIG. 4.

DETAILED DESCRIPTION OF THE INVENTION

Figure 1:
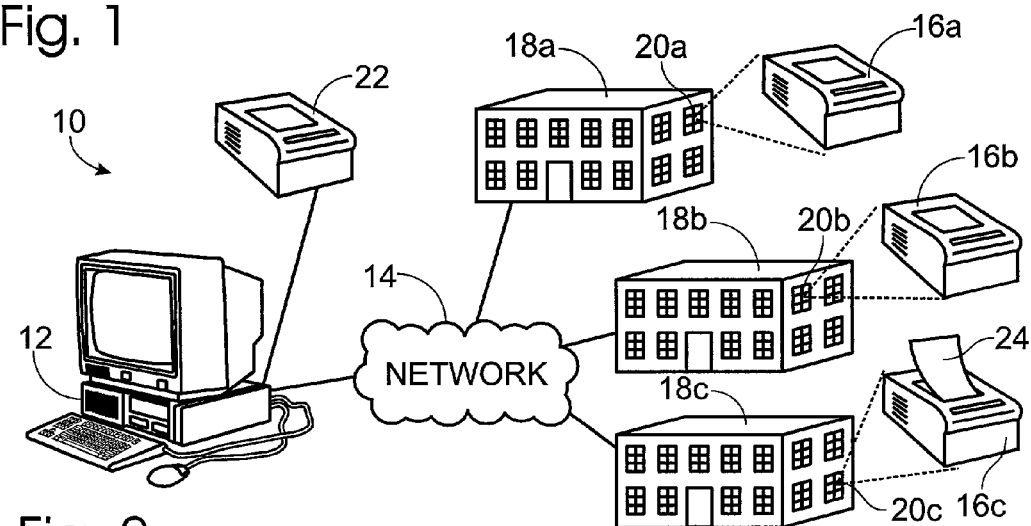
FIG. 1 is an isometric view of a system for selecting a printer based on a schedule, in accordance with the present invention.

The present invention provides a method and system for selecting a printing site for a print job based on a schedule. A network system 10 for carrying out the present invention is shown in FIG. 1. System 10 includes sending processor 12 from which a user sends a print job over network 14 to printer 16a, 16b, or 16c. Printers 16a, 16b, and 16c may be very proximate to sending processor 12, or more typically, as shown in FIG. 1, printers 16a–c are located in separate buildings 18a, 18b, and 18c at printing sites 20a, 20b, and 20c, respectively. The method of the present invention allows the user to readily direct the print job to a convenient printing site 20a–c, either a remote printer, such as printers 16a, 16b, or 16c, or default printer 22, based upon user input parameters including a schedule. In this example, a document 24 specified by the print job was printed on remote printer 16c over network 14.

Figure 2:
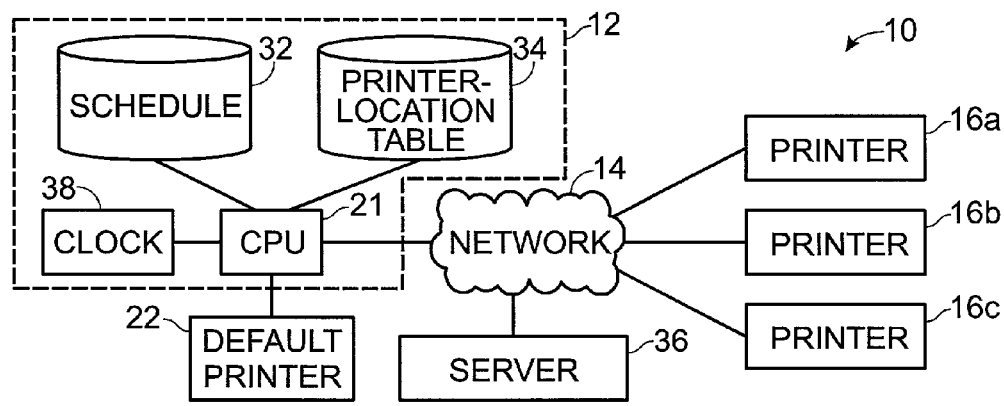
FIG. 2 is a block diagram of the system of FIG. 1.

FIG. 2 shows in more detail how processor 12 of system 10, with central (or parallel) processing unit (CPU) 21, may be configured. In accordance with the invention, memory of processor 12 includes schedule 32 and printer-location table 34. Alternatively, schedule 32 and/or printer-location table 34 may be stored at least partially in onboard memory of a separate network server 36. Processor 12 may also include a clock 38. The present invention requires that processor 12 or server 36 has access to a current time of day and date when needed. Clock 38 may be integral to processor 12 or the processor may request the current time and date from a clock disposed elsewhere on the network.

Processor 12 is any device capable of storing, manipulating, and retrieving data. A processor includes a processing unit (or units) and memory. Examples of a processor that may be suitable for use in the invention include a personal computer, a portable computer, such as a laptop computer, a personal digital assistant, or a cellular phone.

Network 14 is any set of connections that allows communication between processor 12 and printers 16a, 16b, and 16c. A network may be configured as a local area network, for example, a network within a company. Alternatively, a network may be configured as a wide area network, thus allowing the user to identify a conveniently-located printer when traveling away from home or office. As mentioned above, a network may store schedule 32 or printer-location table 34 on network server 36 for the user. In particular, printer-location table 34 may be stored on one server or in a distributed fashion on many servers in the network. This distributed storage would circumvent a requirement for processor 12, or one server, to store all printer location information, and may be useful where the network is a wide area network with a large number of remote printers.

Default printer 22 is an output device to which a user generally sends print jobs when the user is working on processor 12. Although default printer 22 is shown in FIGS. 1 and 2 as directly connected to processor 12, default printer may be in communication with processor 12 through network 14, for example through server 36. Alternatively, system 10 may lack default printer 22.

Figure 3:
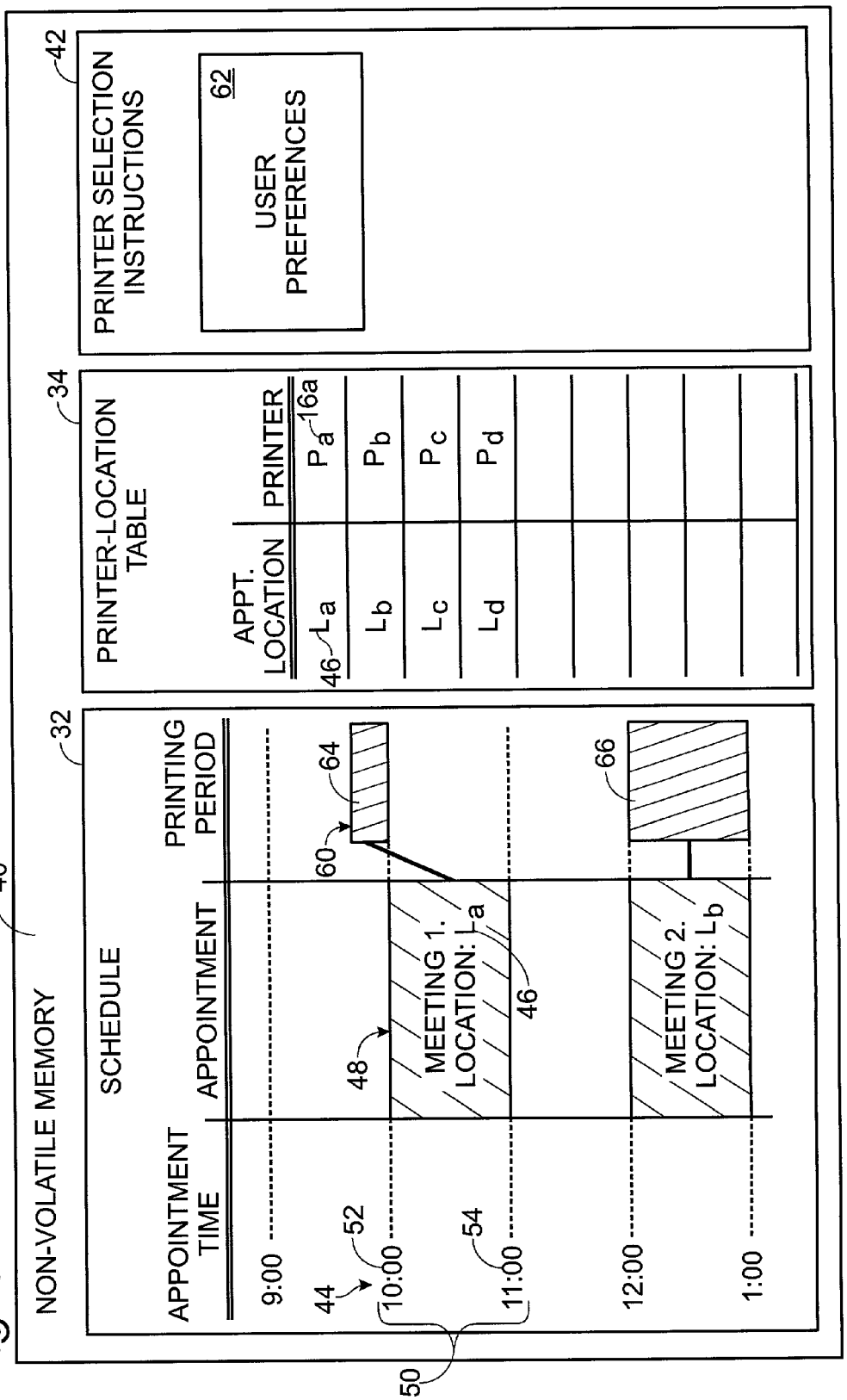
FIG. 3 is a representation of data structures and instructions that may be included in memory of the processor shown in the system of FIGS. 1 and 2.

FIG. 3 is a schematic illustration of data and instructions stored in non-volatile memory 40 of processor 12. Memory 40, which may also be described as, or included in, a program storage device, includes schedule 32, printer-location table 34, and printer selection instructions 42. Processor 12 and memory 40 may be included on one machine or may be distributed over two or more machines or storage devices.

Printer selection instructions 42 use data contained in schedule 32 and printer-location table 34 to select a printer for the user. The printer selections instructions are maintained on a program storage device readable by processor 12 or server 36. The program storage device may be integral with processor 12 or server 36, or located elsewhere on network 14. The program storage device thus tangibly embodies a program of instructions executable by a processor to perform method steps for selecting a printing site for a print job based on a schedule, as outlined below.

Schedule 32 is any representation of an appointment time 44 linked to an appointment location 46 for a user. Schedule 32 is typically in the form of a calendar, in which a user inputs an appointment 48, and associated appointment time 44 and appointment location 46.

Appointment 48 for the purposes of the present invention includes any planned activity that occurs at a known time and place. Examples of appointment 48 include a meeting, a work site, a vacation, a visit, or a meal break. Appointment location 46 specifies the place at which appointment 48 will occur. In the example of FIG. 3, Meeting 1 is at appointment location $L_a$, and Meeting 2 is at appointment location $L_b$. An Appointment location may be implicitly specified when the place is a default site such as a home or an office of the user. Any identifying designation for appointment location 46 may be used that may be directly related by processor 12 to a location in printer-location table 34 (see below).

Appointment time 44 usually defines an appointment interval 50, which is bounded by appointment beginning time 52 and ending time 54. However, in many cases ending time 54 is uncertain and may remain unspecified in the schedule. In these cases, appointment interval 50 may be an estimated interval based on user input parameters (see below).

Printing period 60 of schedule 32 is linked to an appointment location 46 for the appointment, in this case $L_a$. Printing period 60 may be supplied explicitly by the user. For example, printing period 60 may be input by the user along with time 44 and location 46 of an appointment 48. Alternatively, a printing period may be derived from user preferences 62 included in printer selection instructions 42. User preferences 62 may specify rules for defining a printing period in schedule 32 based on appointment interval 50, beginning time 52, and/or ending time 54. For example, a user may specify each printing period to be a 30-minute interval placed immediately before the beginning time of each appointment. In this case when the user issues a print command during a 30-minute interval before an appointment, an appointment location for the appointment will be identified and a corresponding printer selected.

User preferences 62 may be used to determine whether printing period 60 corresponds to a pre-appointment interval 64 or a peri-appointment interval 66. Pre-appointment interval 64 begins and ends before (or at) beginning time 52 of the appointment. Thus, pre-appointment interval 64 and its linked appointment interval 50 are non-overlapping. The user may prefer pre-appointment interval 64 for selecting a printer, for example, when preparing materials for a meeting. This would allow the user to print the materials at a printing site that corresponds to the meeting location, thus minimizing transport of printed materials. Restricting printer selection based on schedule 32 to a pre-appointment interval 64 may help to protect the user from undesirable printing to a remote printing site, for example, when the user did not attend appointment 48 or left the appointment earlier than anticipated.

Printing period may also be a peri-appointment interval 66. Interval 66 is distinct from a pre-appointment interval in that interval 66 is any printing period that at least partially overlaps a linked appointment interval. Typically, the user selects peri-appointment interval 66 as the printing period if printing to a non-default (or default) printer at any time during an appointment interval will benefit the user. For example, if an appointment places the user in an alternative work site where access to a proximate printer would facilitate productivity during some portion of an appointment interval. As shown in FIG. 3, peri-appointment interval 66 may be substantially the same as an appointment interval and include no pre-appointment period. Alternatively, a peri-appointment interval may include only a subset of an appointment interval, and may extend to include times that are outside of the appointment interval.

Printer-location table 34 is any data structure that functions to provide a correspondence between an appointment location and a printer. Typically, table 34 lists many potential appointment locations for the user, in this example $L_a$–$L_d$, and one or more printers that correspond to each appointment location, such as printer $P_a$ 16a for appointment location $L_a$ 46. Therefore, table 34 allows printer selection instructions 42 to select a printer based on an appointment location present in schedule 32.

A printer is usually selected to correspond to location 46 based on relative proximity of the printer to the location. However, there may be many exceptions. For example, a printer may correspond to a location based on which printers are available for use by the user, and/or which printers are configured to handle the print jobs. Correspondence of printers and locations in table 34 may be determined by the user, a network manager, or other designated individual or group of individuals. When more than one printer corresponds to one appointment location, the printers may be ranked according to suitability for the appointment location. For example, the printers may be ranked according to relative proximity to the appointment location.

Figure 4:
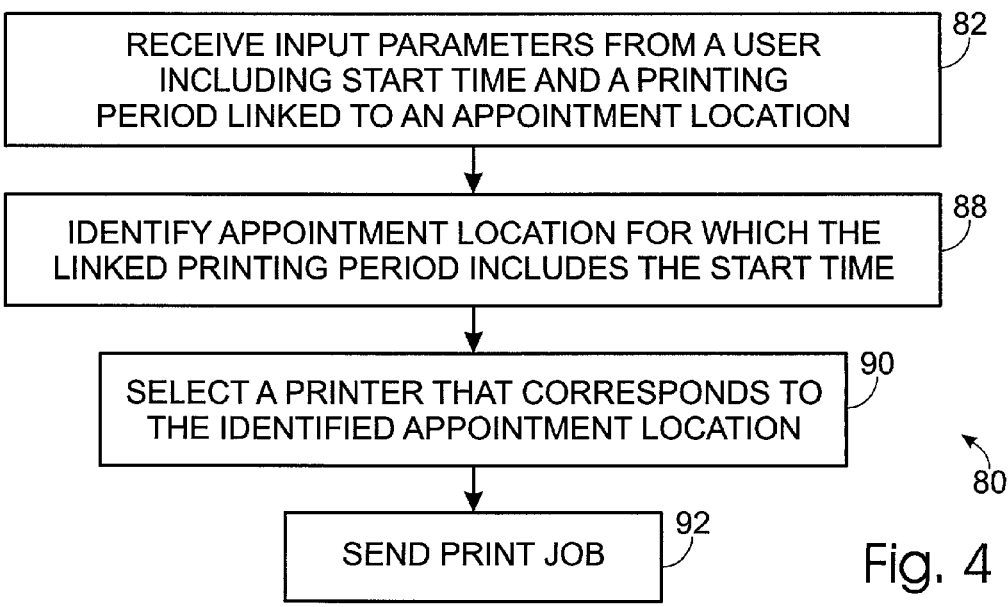
FIG. 4 is a flowchart of a method for selecting a printer based on a schedule, in accordance with the present invention.

FIG. 4 illustrates a method 80, in accordance with the present invention, for selecting a printer based on schedule 32, table 34, and instructions 42. As shown at 82, a processor receives input parameters from the user. Input parameters include a start time and a printing period linked to an appointment location. Start time is a point in time at which the user wishes to initiate printer selection or actual printing and may be the current time, which may be specified directly by issuing a print command to the processor. Alternatively, the start time may be a time in the future that is indicated by the user, for example, by input into the user preferences. Whether start time is specified to be current or in the future, the clock may be used to determine when the start time has been reached.

The printing period and linked appointment location may be read directly from the schedule as input by the user. Alternatively, the printing period may be determined from the appointment time or the appointment interval, and user preferences in the printer selection instructions that specify a relationship between these parameters and the printing period.

The processor then identifies the appointment location for which the linked printing period includes a start time, as shown at 88. Typically, the processor uses printer selection instructions to compare the start time with one or more printing periods. If the start time is included within a printing period, then the linked appointment location is identified. As shown at 90, the printer selection instructions then may direct selection of a printer that corresponds to the appointment location identified at 88. The processor carries out step 90 by finding the identified appointment location in the printer-location table and selecting a printer that corresponds to the appointment location. At 92, the processor sends the print job to the selected printer.

FIG. 5 is an expanded flowchart for method 80, and includes decision points to illustrate how the processor and the user may control selection of a remote or default printer. As shown at 88, identification of the appointment location may include several steps. At 96, the processor queries the schedule to compare the start time with the printing period. As shown at 98, the processor determines whether a printing period includes the start time. If the start time is not within any printing period, the default printer is selected, as shown at 100. Default printer selection may include presenting the user with a standard choice of printers. Alternatively, if the start time is included in a printing period, the processor queries the schedule to identify the appointment location that is linked to the identified printing period, as shown at 102.

The identified appointment location is used in step 90 to select the printer. First, the processor queries the printer-location table to identify the printer(s) corresponding to the identified appointment location, as shown at 104. The processor determines if user confirmation is required, as shown at step 106. Generally, user confirmation may be required if more than one printer corresponds to the appointment location, or if the user has requested user confirmation in user preferences 62. If user confirmation is required, the processor requests user confirmation at step 108. Based on an affirmative or negative response received from the user at step 110, the processor selects a non-default printer at step 112 or default printer at step 100, respectively. The processor then sends the print job to the printer at step 92 or to the default printer at step 114.

When the processor sends the print job to a printer, the print job typically must be translated and formatted so that the printer is able to recognize and process the print job. Each different make and model of printer may require the print job to be presented in a different form in order to allow printing. In some cases, the processor carries out translating and formatting for each print job that allow each printer to print. However, network 14 may be distributed over a wide area and include a large number of printers. The large number of printers may preclude the processor from storing instructions, such as printer drivers, that direct correct translation and formatting of each print job. This may be particularly true when the processor is a portable device with limited memory.

The present invention provides an optional alternative to printer-specific translation and formatting by a processor for a printer. In this alternative, the processor translates and formats a print job into a standard language and standard format. The standard language and format is generally independent of the specific printer that was selected. An suitable example of a standard language and format for the present invention are PDL (postscript description language) and PDF (page description format), respectively. Use of the standard language and format would allow a processor to send a print job in a standard intermediate form over network 14. Final translation and formatting may be carried out by a server in network 14 or by the printer itself.

It is believed that the disclosure set forth above encompasses multiple distinct inventions with independent utility.

While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

I claim:

1. A method for selecting a printing site for a print job of a user based on an appointment calendar of the user, comprising the steps of:

receiving a print job from a user selecting a start time and a document to be printed;

receiving an appointment calendar of a user including time periods linked to meetings scheduled for the user during the time periods;

comparing the start time with the time periods to identify a meeting having a linked time period corresponding to the start time;

selecting a printer that is proximate to the identified meeting; and printing the document with the printer.

2. The method of claim 1, where the time periods include a pre-meeting interval.

3. The method of claim 1, where the time periods include a peri-meeting interval.

4. The method of claim 1, where the start time is current time.

5. The method of claim 1, further including requesting a confirmation of the printer.

6. The method of claim 1, where selecting is performed based on a printer-location table that ranks a plurality of printers based on relative proximity to the identified meeting.

7. A system for selecting a printing site for a print job of a user based on an appointment calendar of the user, comprising:

a plurality of printers that are proximate to respective meetings linked to time periods in an appointment calendar of a user; and a processor operatively linked to the plurality of printers and adapted to receive a print job from a user selecting a start time and a document to be printed, to compare the start time with the time periods to identify a meeting having a linked time period in the appointment calendar corresponding to the start time, to select a printer proximate to the identified meeting and to print the document with the printer.

8. The system of claim 7, where the time periods include a pre-meeting interval.

9. The system of claim 7, where the time periods include a peri-meeting interval.

10. The system of claim 7, where the processor is further adapted to request a confirmation of the printer.

11. The system of claim 10, where the processor is adapted to offer a default printer in the confirmation request, as an alternative.

12. A program storage device readable by a processor, tangibly embodying a program of instructions executable by the processor to perform method steps for selecting a printing site for a print job of a user based on an appointment calendar of the user, the method steps comprising:

receiving a print job from a user selecting a start time and a document to be printed;

receiving an appointment calendar of a user including time periods linked to meetings scheduled for the user during the time periods;

comparing the start time with the time penods to identify a meeting having a linked time period corresponding to the start time;

selecting a printer that is proximate to the identified meeting; and printing the document with the printer.

13. The program storage device of claim 12, where the time periods include a pre-meeting interval.

14. The program storage device of claim 12, where the time periods include a peri-meeting interval.

15. The program storage device of claim 12, where the start time is current time.

16. The program storage device of claim 12, further including requesting a confirmation of the printer.

17. The program storage device of claim 12, where selecting is performed based on a printer-location table that ranks a plurality of printers based on relative proximity to the identified meeting.

* * * * *

UNITED STATES PATENT AND TRADEMARK OFFICE
CERTIFICATE OF CORRECTION

PATENT NO. : 7,084,997 B2
APPLICATION NO. : 09/905414
DATED : August 1, 2006
INVENTOR(S) : James Clough It is certified that error appears in the above-identified patent and that said Letters Patent is hereby corrected as shown below:

In column 6, line 52, in Claim 7, after "meeting" insert -- , --.

In column 7, line 6, in Claim 12, delete "penods" and insert -- periods --, therefor.

Signed and Sealed this

Eleventh Day of August, 2009

David J. Kappos
*Director of the United States Patent and Trademark Office*